Jan. 12, 1943.  C. C. HAHN  2,308,075
STOKER
Filed Oct. 19, 1939  2 Sheets-Sheet 1
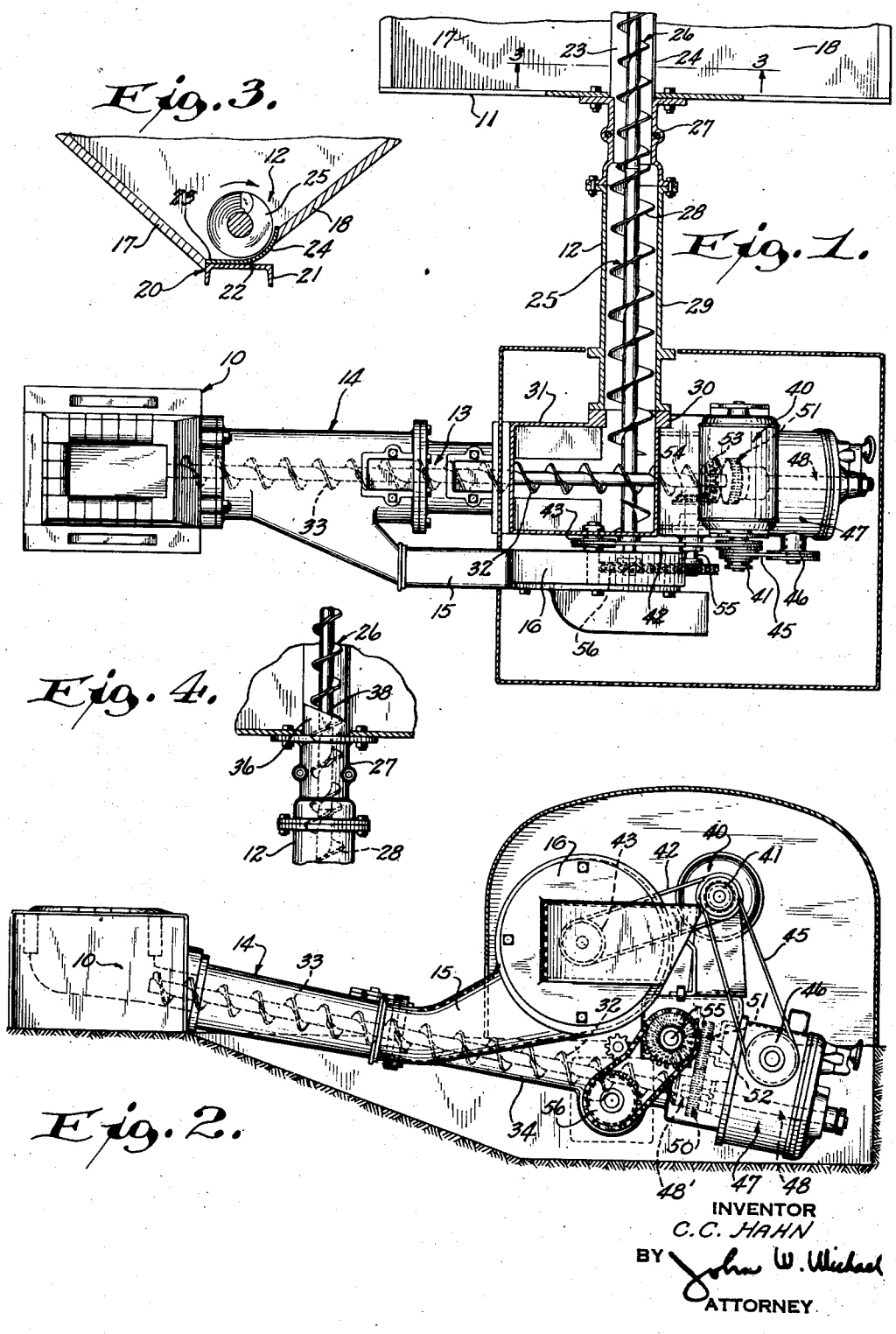
INVENTOR
C. C. HAHN
BY John W. Michael
ATTORNEY Jan. 12, 1943. C. C. HAHN 2,308,075
STOKER
Filed Oct. 19, 1939 2 Sheets-Sheet 2
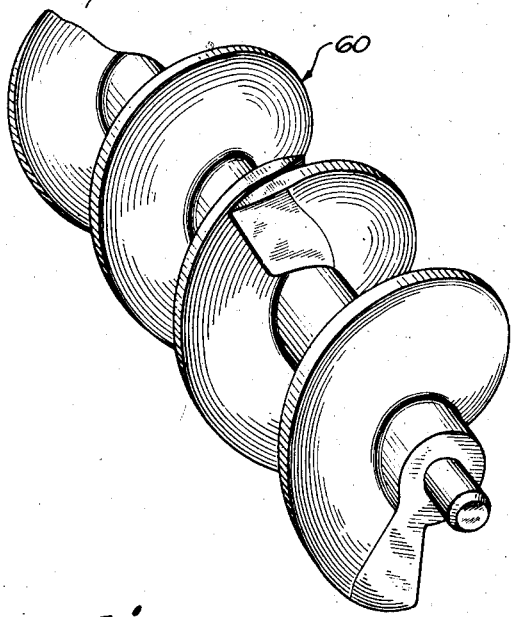
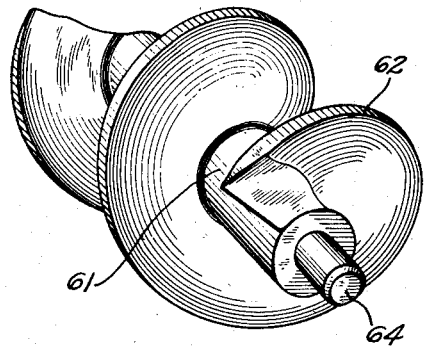
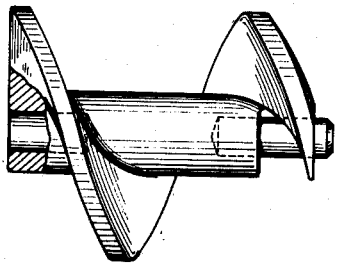
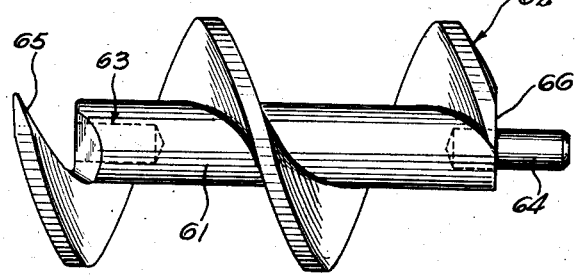
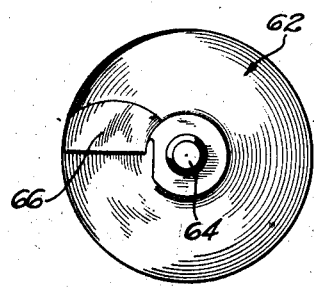
INVENTOR
C. C. HAHN.
BY John W. Michael
ATTORNEY Patented Jan. 12, 1943

2,308,075

UNITED STATES PATENT OFFICE 2,308,075

STOKER

Clarence C. Hahn, West Bend, Wis., assignor to Gehl Bros. Mfg. Co., West Bend, Wis., a corporation of Wisconsin Application October 19, 1939, Serial No. 300,137

1 Claim. (Cl. 198—213)

This invention relates to an improvement in stokers, and while some of its features are especially designed and adapted for a bin-fed stoker, other important features are applicable with equal advantage to either the bin-fed type or the hopper-fed type of stoker.

One of the principal objects of the invention is to provide a novel form of feed conveyor for the coal, and with respect to this feature the invention is applicable with equal advantage to either bin-fed or hopper-fed types of stokers. In particular, the feed conveyor is markedly improved in the manner in which its feed screw is constructed and organized, the screw being constituted of sections having adjacent ends piloted one within the other so as to be alined, and having the meeting portions of the flights of adjacent ends overlapped or interengaged so as to provide a driving connection between the screw sections. This structural organization has the advantage of greatly facilitating the assembly and disassembly of the feed conveyor, and in operation has the distinct advantage of preserving the maximum capacity of the flights. In other words, it has been practiced heretofore to couple the sections of a sectional feed screw or feed conveyor by means of coupling sleeves or similar devices which introduce an obstruction in the fuel passage between the flights. This not only reduces the capacity of the feed conveyor but frequently results in jamming of the coal in the conveyor, with interruption of efficient operation and injury to the stoker.

Another important object of the invention, especially advantageous in connection with the bin-fed type of stoker, is the provision made for disposing the retort of the stoker at the proper elevation for the most efficient operation in the combustion chamber of the furnace, and yet make it practical to take the fuel from the low point of the bin and convey it to the retort feed conveyor through a pit or gutter below the level of the floor of the basement, so that no obstruction will be offered which would prevent traffic over the feed conveyor, or might result in persons stumbling thereover.

A still further object of the invention is to provide a novel and advantageous structure of bin feed conveyor, one which limits the extent to which the conveyor is loaded to its maximum capacity, and one which prevents objects liable to injure or jam the conveyor from getting into the control of the flights of its screw.

Other objects and advantages reside in certain novel features of the construction, arrangement, and combination of parts, which will be hereinafter more fully described and particularly pointed out in the appended claim, reference being had to the accompanying drawings forming a part of this specification, and in which:

Figure 1 is a view partly in top plan and partly in horizontal section showing the bin feed type of stoker embodying the present invention, the illustration of the gearing between the electric motor of the stoker and the feed screws and blower being largely diagrammatic.

Figure 2 is a view in side elevation of the construction shown in Figure 1.

Figure 3 is a fragmentary view in transverse vertical section illustrating the construction of the lower part of the bin and its associated feed conveyor.

Figure 4 is a fragmentary view of a top plan of bin feed conveyor showing particularly the deflector combined therewith.

Figure 5 is a fragmentary perspective view illustrating the manner in which adjacent sections of the feed screw are overlapped to provide a driving connection therewith.

Figure 6 is a perspective view showing a portion of one section of the bin feed conveyor and illustrating the pin formation provided on one end of each such section.

Figures 7 and 8 are views in side elevation showing a pair of adjacent sections of the feed screw, and illustrating the structure by which the sections are piloted one into the other.

Figure 9 is a view in end elevation illustrating the end of the screw section which has a pin formation thereon.

Referring to the drawings, and more particularly to Figures 1 and 2, the numeral 10 designates the retort of the stoker which is adapted to be positioned at any desired elevation in the combustion chamber of a furnace (not shown). Of course, the stoker is adapted to be used with any type of furnace, namely hot air, hot water, steam or vapor, or the like. The type of stoker illustrated is the bin-fed type, although, of course, as will be obvious to those skilled in the art, and as indicated, some of the features of the present invention are applicable not only to the bin-fed type but also to the hopper type.

Generally speaking, the coal is fed from the bin, designated at 11, by means of a bin feed conveyor, designated generally at 12, to the retort feed conveyor, designated generally at 13. Part of the conduit or trough of the retort feed conveyor 13 extends through a combined coal and air tube unit, designated at 14, which is coupled up to the retort 10. Air is supplied to the air passages of this combination tube 14 through an air supply conduit 15 leading from a blower 16.

As shown in Figure 3, the bin 11 is formed with converging or downwardly and inwardly inclined or sloping bottom walls 17 and 18, which deliver the coal under the influence of gravity to the bin feed conveyor, designated generally at 12.

This conveyor 12 has a trough, designated generally at 20, made up of an inverted channel 21 extending across the entire width of the bin, and having welded thereto the flat portion 23 of an elongated limit feed plate 22, which also has a portion 24 arcuate in section extending upwardly and away from the channel and conforming to the contour of the bin fed feed screw, designated generally at 25. The screw 25 includes the section 26 located in the bin and extending through the discharge fitting 27 thereof. The section 26 is coupled to a second bin feed screw section 28, which extends through a conduit 29 coupled at one end to discharge fitting 27, and at its other end to the housing 31 of the stoker chassis 31. The portion of the section 28 of the bin feed screw which extends into the stoker chassis underlies a section 33 of the feed screw 32 of the retort feed conveyor 13, and is in such relation thereto that the coal advanced by the screw 25 will be picked up by the retort feed screw 32 and carried on to the retort. The retort feed screw also includes a second section 33 coupled to section 32, and extending to the retort 10 through a conduit 34 and through the coal tube of the combination coal and air tube 14.

In the operation of the stoker the limit feed engaging plate 24 controls the extent to which the bin feed screw 26 is loaded, and prevents overloading thereof.

In order to prevent large objects, such as chunks of metal or the like, from getting into the flights of the bin feed screw 25 and injuring or damaging the same, a deflector, designated generally at 36, is provided, and may be provided as part of the discharge fitting 27. It has an inclined deflector face 38 overlying and extending transversely of the bin feed screw, and consequently so positioned as to deflect such objects away from the screw.

The feed screws of the conveyors and the blower are all driven by an electric motor 40 mounted on the stoker chassis. The armature shaft of this motor projects from its housing and carries a series of pulleys 41 of different radii. One of the pulleys acts through a belt 42, and a driven pulley 43 fixed to the blower shaft to drive the blower. The remaining pulleys of the series 41 may be selectively employed to drive the belt 45, which in turn drive a pulley 46 fixed to the input shaft of the speed reducer, designated generally at 47. The output shaft 48 (see Figure 2) of the speed reducer drives both the retort feed screw 32 and the bin feed screw 25, the retort feed screw 32 being directly coupled to and driven by the output shaft 48 whereas the bin feed screw is driven therefrom by suitable gearing. In the construction shown, the outer end 48' of the shaft 48 is squared and fits in a correspondingly formed socket in the adjacent end of feed screw 32. Just inwardly of its squared end the shaft 48 has a spur gear 50 fixed thereto and meshing with and driving a twin spur gear 51 fixed on a short shaft 52 supported for rotation on the stoker chassis and also having a bevel gear 53 fixed thereto and meshing with and driving a companion bevel gear 54. Bevel gear 54 is fixed on shaft 55 also rotatably mounted in suitable bearings and acting through chain and sprocket gearing 56 to drive the bin feed screw 25. Of course this drive is only diagrammatically illustrated, and it may be changed to suit conditions or requirements of any particular installation.

One of the important features of the invention resides in the special construction of the feed screws for the bin feed conveyor, and also for the retort feed conveyor. As illustrated in Figures 5, 7, and 8, these feed screws are constituted of similar sections, designated generally at 60. Each section has a central spindle or shaft 61, and has a spiral flight 62 which may be cast integral with the central shaft of the spindle. An axial opening 63 is formed in one end of each screw section and at the opposite end of each section a pin 64 rigid with the shaft projects axially therefrom. The terminal portions of the spiral flight of each screw section are oppositely tapered or beveled off, as indicated at 65 and 66. With such a construction the pin and socket formations of adjacent screw sections may be interfitted to pilot one section into the other and thereby aline the same, and the meeting portions of the flights of adjacent sections are overlapped, as shown in Figure 5, to provide a driving connection or rotative coupling between the adjacent screw sections. This construction not only greatly facilitates assembly and disassembly of the feed screws but minimizes the obstruction between the flights. In other words, the passage defined by the flights, and through which the coal is advanced, is approximately uniform through its extent, and obstructions or reduced areas in which the coal may jam or bind are minimized.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claim.

I claim:

A stoker having a feed conveyor comprising a conduit and a feed screw in said conduit comprising a plurality of sections, each screw section having a central spindle and a spiral flight integral with the spindle, each central spindle having an axial opening at one end and a pilot pin at its other, said sections in the assembly having the pilot pin of one detachably interfitted in the adjacent axial opening of the other, the end portions of the flights of the sections projecting beyond the ends of their spindles and being double beveled and in interlocking overlapping engagement.

CLARENCE C. HAHN.